US012713460B2

(12) United States Patent
Mandelli et al.

(10) Patent No.: US 12,713,460 B2
(45) Date of Patent: Aug. 18, 2026

(54) SENSING SIGNAL BURST CONFIGURATION FOR OBJECT SENSING FOR WIRELESS NETWORKS

(71) Applicant: Nokia Technologies Oy, Espoo (FI)

(72) Inventors: Silvio Mandelli, Stuttgart (DE); Arman Ahmadzadeh, Munich (DE); Marcus Roland Henninger, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 767 days.

(21) Appl. No.: 18/309,191

(22) Filed: Apr. 28, 2023

(65) Prior Publication Data

US 2024/0365377 A1 Oct. 31, 2024

(51) Int. Cl.
*H04W 74/0808* (2024.01)
*H04L 5/00* (2006.01)

(52) U.S. Cl.
CPC ....... *H04W 74/0808* (2013.01); *H04L 5/0048* (2013.01)

(58) Field of Classification Search
CPC ......................... H04W 74/0808; H04L 5/0048
See application file for complete search history.

(56) References Cited

U.S. PATENT DOCUMENTS

2022/0263621 A1 8/2022 Cha et al.
2025/0097877 A1 * 3/2025 Zorgui .................. H04L 5/0048

OTHER PUBLICATIONS

"3rd Generation Partnership Project; Technical Specification Group Radio Access Network; NR; Radio Resource Control (RRC) protocol specification (Release 17)", 3GPP TS 38.331, V17.4.0, Mar. 2023, pp. 1-1324.
"Initial Study on Integrated Sensing and Communication for NR", 3GPP TSG RAN Meeting #99, RP-230378, Agenda: 9.12, vivo, Mar. 20-23, 2023, pp. 1-23.
"3rd Generation Partnership Project; Technical Specification Group Radio Access Network; NR; Medium Access Control (MAC) protocol specification (Release 17)", 3GPP TS 38.321, V17.4.0, Mar. 2023, pp. 1-252.

* cited by examiner

*Primary Examiner* — Myron Wyche
(74) *Attorney, Agent, or Firm* — Barta Jones, PLLC

(57) ABSTRACT

A method includes receiving, by a user device from a network node, configuration information to configure the user device to transmit a plurality of sensing signal bursts, wherein each of the sensing signal bursts includes a plurality of sensing signal transmissions, the configuration information indicating at least: a burst period indicator indicating a period of each of the sensing signal bursts; and a burst on-duration indicator indicating a duration of the plurality of sensing signal transmissions in each of the sensing signal bursts; and transmitting, by the user device, the plurality of sensing signal bursts in accordance with the configuration information.

20 Claims, 8 Drawing Sheets

Figure 6:
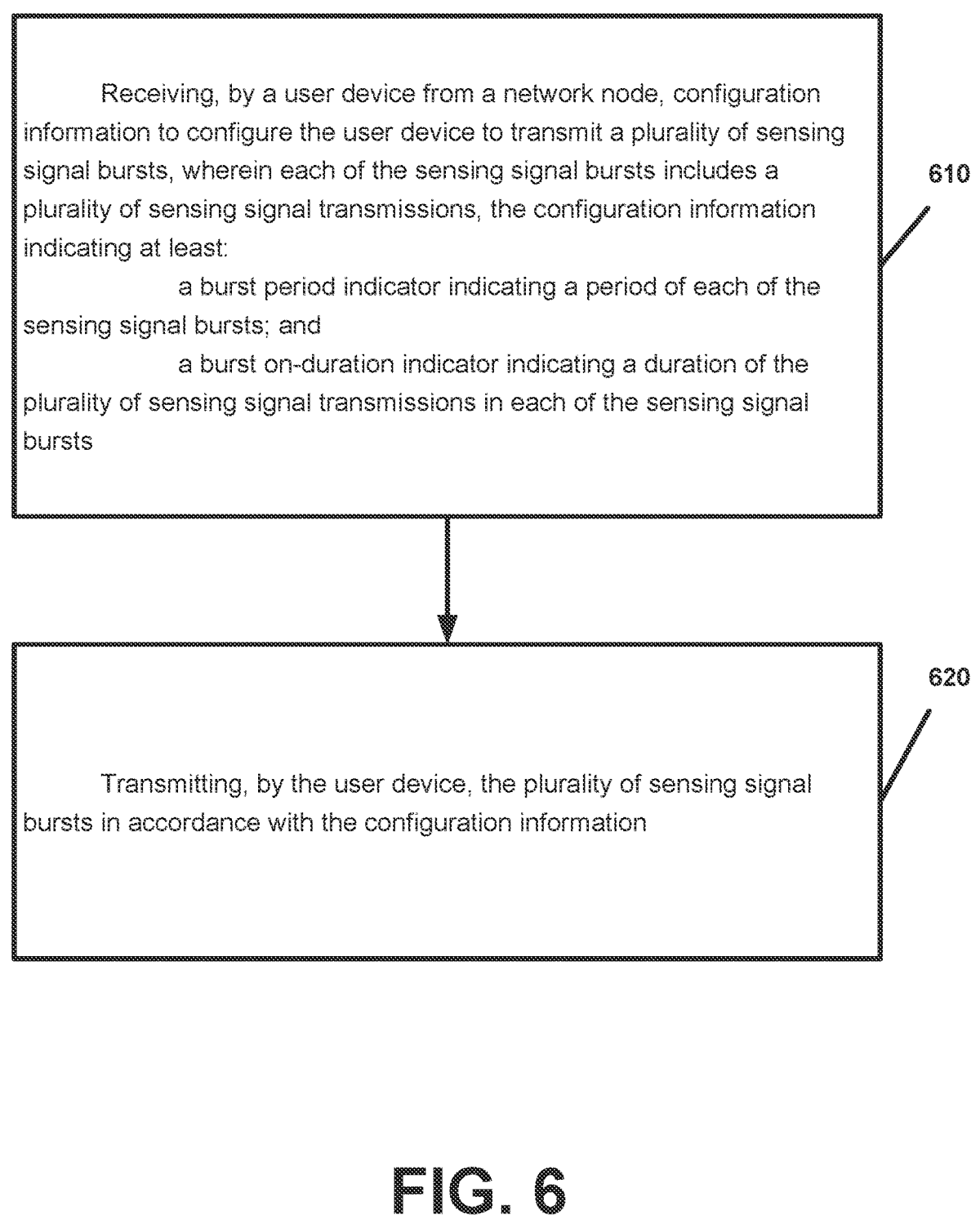

Receiving, by a user device from a network node, configuration information to configure the user device to transmit a plurality of sensing signal bursts, wherein each of the sensing signal bursts includes a plurality of sensing signal transmissions, the configuration information indicating at least:

a burst period indicator indicating a period of each of the sensing signal bursts; and a burst on-duration indicator indicating a duration of the plurality of sensing signal transmissions in each of the sensing signal bursts

610

Transmitting, by the user device, the plurality of sensing signal bursts in accordance with the configuration information

Figure 7:
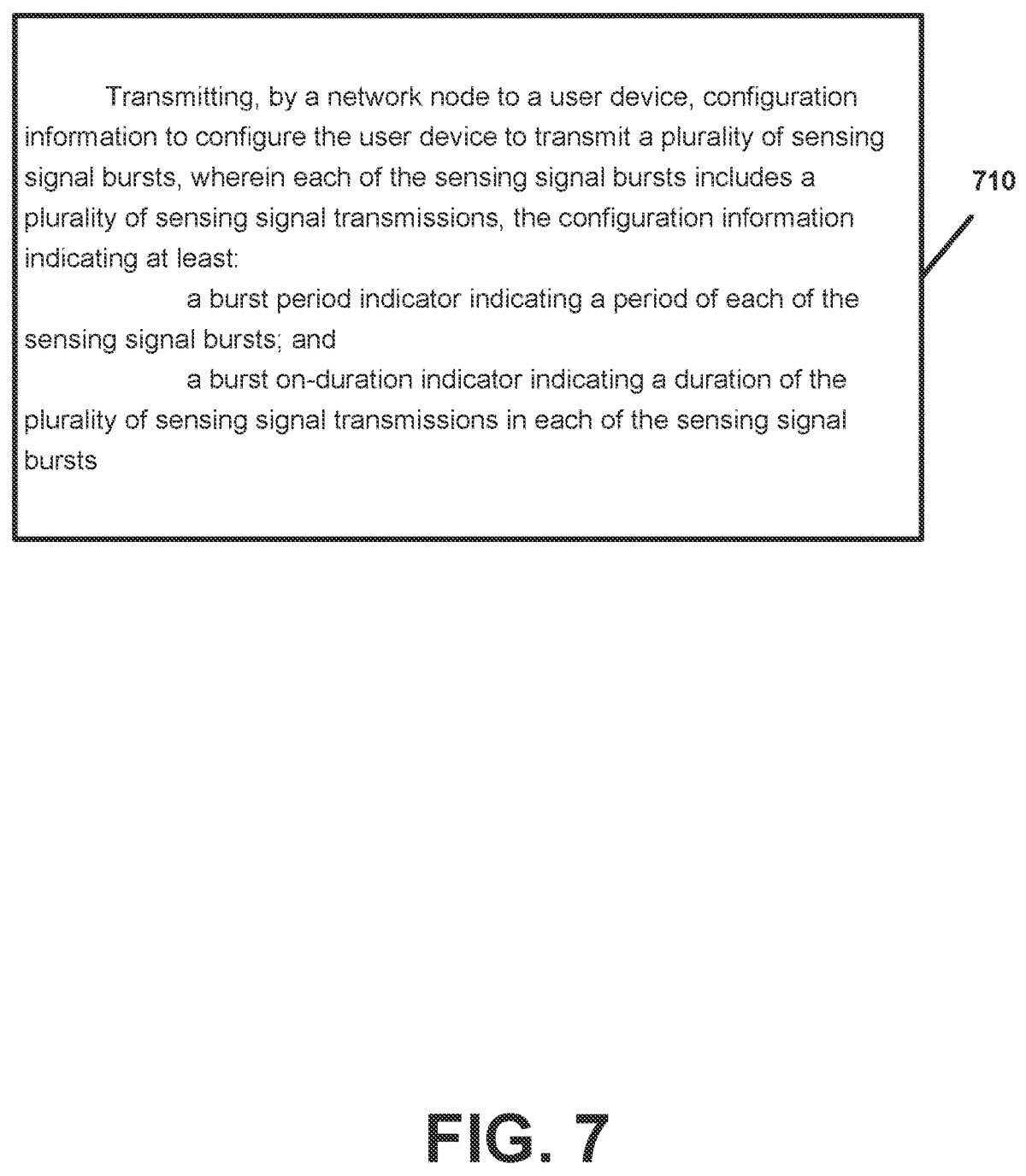

Transmitting, by a network node to a user device, configuration information to configure the user device to transmit a plurality of sensing signal bursts, wherein each of the sensing signal bursts includes a plurality of sensing signal transmissions, the configuration information indicating at least:

a burst period indicator indicating a period of each of the sensing signal bursts; and a burst on-duration indicator indicating a duration of the plurality of sensing signal transmissions in each of the sensing signal bursts

SENSING SIGNAL BURST CONFIGURATION FOR OBJECT SENSING FOR WIRELESS NETWORKS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE). E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency. Other wireless networks are now being developed, such as 6G.

SUMMARY

A method may include receiving, by a user device from a network node, configuration information to configure the user device to transmit a plurality of sensing signal bursts, wherein each of the sensing signal bursts includes a plurality of sensing signal transmissions, the configuration information indicating at least: a burst period indicator indicating a period of each of the sensing signal bursts; and a burst on-duration indicator indicating a duration of the plurality of sensing signal transmissions in each of the sensing signal bursts; and transmitting, by the user device, the plurality of sensing signal bursts in accordance with the configuration information.

An apparatus may include at least one processor; and at least one memory including computer program code; the at least one memory and the computer program code configured to, with the at least one processor, cause the apparatus at least to: receive, by a user device from a network node, configuration information to configure the user device to transmit a plurality of sensing signal bursts, wherein each of the sensing signal bursts includes a plurality of sensing signal transmissions, the configuration information indicating at least: a burst period indicator indicating a period of each of the sensing signal bursts; and a burst on-duration indicator indicating a duration of the plurality of sensing signal transmissions in each of the sensing signal bursts; and transmit, by the user device, the plurality of sensing signal bursts in accordance with the configuration information.

A method may include transmitting, by a network node to a user device, configuration information to configure the user device to transmit a plurality of sensing signal bursts, wherein each of the sensing signal bursts includes a plurality of sensing signal transmissions, the configuration information indicating at least: a burst period indicator indicating a period of each of the sensing signal bursts; and a burst on-duration indicator indicating a duration of the plurality of sensing signal transmissions in each of the sensing signal bursts.

An apparatus may include at least one processor; and at least one memory including computer program code; the at least one memory and the computer program code configured to, with the at least one processor, cause the apparatus at least to: transmit, by a network node to a user device, configuration information to configure the user device to transmit a plurality of sensing signal bursts, wherein each of the sensing signal bursts includes a plurality of sensing signal transmissions, the configuration information indicating at least: a burst period indicator indicating a period of each of the sensing signal bursts; and a burst on-duration indicator indicating a duration of the plurality of sensing signal transmissions in each of the sensing signal bursts.

Other example embodiments are provided or described for each of the example methods, including: means for performing any of the example methods; a non-transitory computer-readable storage medium comprising instructions stored thereon that, when executed by at least one processor, are configured to cause a computing system to perform any of the example methods; and an apparatus including at least one processor, and at least one memory including computer program code, the at least one memory and the computer program code configured to, with the at least one processor, cause the apparatus at least to perform any of the example methods.

The details of one or more examples of embodiments are set forth in the accompanying drawings and the description below. Other features will be apparent from the description and drawings, and from the claims.

BRIEF DESCRIPTION OF THE DRAWINGS

FIG. 6 is a flow chart illustrating operation of a user device (or UE) according to an example embodiment.

FIG. 7 is a flow chart illustrating operation of a network node or gNB according to an example embodiment.

DETAILED DESCRIPTION

Figure 1:
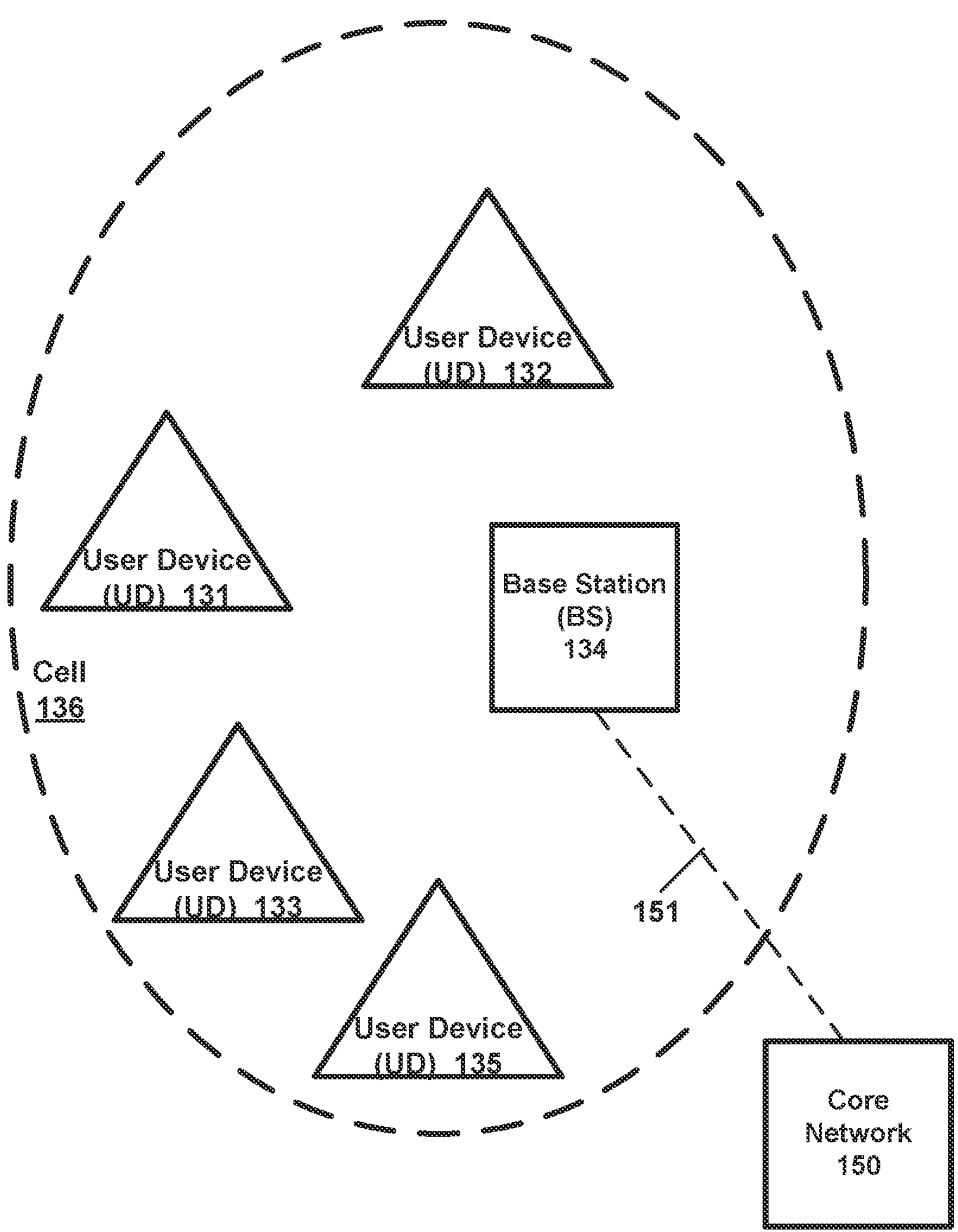
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS or split gNB). At least part of the functionalities of a BS (e.g., access point (AP), base station (BS) or (e) Node B (eNB), gNB, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a/centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node or network node (e.g., BS, eNB, gNB, CU/DU, . . . ) may forward data to the UE that is received from a network or the core network, and/or forward data received from the UE to the network or core network. RAN nodes or network nodes (e.g., BS, eNB, gNB, CU/DU, . . . ) may perform a wide variety of other wireless functions or services, e.g., such as broadcasting control information (e.g., such as system information or on-demand system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform.

A user device or user node (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. Also, a user node may include a user equipment (UE), a user device, a user terminal, a mobile terminal, a mobile station, a mobile node, a subscriber device, a subscriber node, a subscriber terminal, or other user node. For example, a user node may be used for wireless communications with one or more network nodes (e.g., gNB, eNB, BS, AP, CU, DU, CU/DU) and/or with one or more other user nodes, regardless of the technology or radio access technology (RAT). In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) and/or 6G, as examples, may also include a core network.

In addition, the techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)-related applications may require generally higher performance than previous wireless networks. 6G and other wireless networks may continue to require even greater performance.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The techniques described herein may be applied to a wide variety of wireless technologies or wireless networks, such as 5G (New Radio (NR)), cmWave, and/or mmWave band networks, IoT, MTC, eMTC, eMBB, URLLC, 6G, etc., or any other wireless network or wireless technology. These example networks, technologies or data service types are provided only as illustrative examples.

According to an example embodiment, it may be desirable for a next generation of user devices, UEs or other wireless devices, to assist in performing (and/or perform) network sensing of objects in the environment. Network sensing may include a node transmitting a radio (wireless) signal, and then (the same node or a different node) using the received reflections of those transmitted signals (which reflect off of one or more objects in the environment, such as cars, people, buildings, etc.) to, e.g., determine speed of an object. The network sensing, e.g., may include Doppler sensing, which may include determining or estimating a Doppler shift from a phase shift between consecutive receptions of transmissions of a known signal that are reflected off of a moving object, for example. Thus, a network sensing may be used to estimate a speed of an object, for example. Other types of sensing may be performed. The sensing may be provided as part of joint communication and sensing (JCAS).

In general, sensing applications should offer a high resolution, referring to the capability to discriminate close targets (objects), and should be able to tolerate high maximum values of the parameter(s) of interest to be sensed. For Doppler (or velocity/speed, terms to be used interchangeably hereinafter) sensing, which uses signals reflections with the environment generated by signals transmitted periodically over time, this leads to the requirements of 1) being able to distinguish targets moving at similar velocities (high velocity resolution $\Delta v$), while 2) allowing for high maximum velocities (high unambiguous velocity $v_{max}$).

From the well-known formulas for $\Delta v$ and $v_{max}$, the requirements for the burst length $T_{Burst}$ (i.e., for how long a burst of signals must be transmitted), as well as for the periodicity $T_{Per}$ (or a sensing signal gap) (i.e., the minimum time between consecutive signal transmissions within a burst) can be formulated (as an illustrative example) as:

$$T_{Burst} > \frac{c}{2 \cdot \Delta v \cdot f_c} \quad (1)$$

$$T_{Per} < \frac{c}{2 \cdot f_c \cdot v_{max}} \quad (2)$$

where c is the speed of light and $f_c$ denotes the carrier frequency.

From Eqs. (1) and (2) it can be readily seen that more stringent requirements on $\Delta v/v_{max}$ lead to a larger/shorter $T_{Burst}/T_{Per}$. Therefore, standards should allow burst like transmissions of pilots over a long enough time and with a certain periodicity to achieve a good Doppler sensing performance. As a result, to allow for adequate network sensing (e.g., Doppler sensing) performance, a UE may typically need to transmit many signal bursts (e.g., tens, hundreds or even thousands of signal bursts), which can create excessive signaling overhead for gNB and UE.

ILLUSTRATIVE EXAMPLES

To obtain some illustrative examples for the requirements on $T_{Burst}$ and $T_{Per}$ for typical use cases, two numerical examples are given in the following.

Example 1 (Indoor Factory)

For an indoor factory scenario (e.g., sensing automated guided vehicles (AGVs) or humans) in FR1 with $f_c$=3.5 GHZ, requirements of $$\Delta v = 0.5\frac{m}{s} \text{ and } v_{max} = 10\frac{m}{s}$$

are assumed. Using (1) and (2) yields a minimum burst duration of $T_{Burst}$=85.7 ms, as well as a maximum periodicity of $T_{Per}$=4.3 ms.

Example 2 (Outdoor Highway)

Analogously, values can be computed for an outdoor use case (e.g., sensing cars on a highway), where the requirement on $\Delta v$ may be relaxed, but a higher $v_{max}$ must be tolerated. Assuming $$\Delta v = 2\frac{m}{s} \text{ and } v_{max} = 40\frac{m}{s}$$

leads to $T_{Burst}$>21.4 ms and $T_{Per}$<1.1 ms.

Those requirements can be formulated in the same way also for FR2, where the higher carrier frequencies allow for shorter burst lengths achieving same resolution performance, but at the same time also require a shorter periodicity to achieve the same unambiguous velocity $v_{max}$.

This makes clear that to enable Doppler sensing that fulfils the typical requirements outlined above, the burst like transmission of pilot symbols with short enough periodicities and for a sufficiently long burst duration must be possible in standardized mobile networks.

According to 5G, the UE may transmit sounding reference signals (SRS).

Sounding Reference Signal (SRS):

SRS is an UL reference signal that is transmitted according to the instructions by gNB. The gNB measures the UL channel based on the received SRS and can use the measurement for a variety of functions or purposes, such as: UL channel scheduling and link adaptation; DL channel estimation when UL/DL (uplink/downlink) channel reciprocity exists; Non-codebook based transmissions to instruct the UE to choose UE-generated precoding weights for transmission of Physical Uplink Shared Channel (PUSCH); Codebook based transmissions to instruct the UE to select the antenna ports used for PUSCH, and to select Rank and precoding weights; and, UL beam management when communication link between UE and gNB does not support uplink-downlink beam correspondence.

In 5G NR, UE may be configured with one or more "SRS Resource Set(s)", wherein every "SRS Resource Set" is associated with one or more "SRS Resources". In particular, some of the configuration parameters of SRS are done at the set level and some at the resource level. For instance, the SRS triggering mechanism is configured at set level, see "SRS-ResourceSet" RRC parameter structure. As provided by a ResourceSet, a SRS triggering mechanism is indirectly set via the parameter "resourceType", i.e., "resourceType" determines implicitly the type of triggering mechanism (e.g., RRC configuration, downlink control information (DCI), or MAC (media access control) control element (MAC CE).

Current 5G NR specifications support three different "resourceType" namely, aperiodic, semi-persistent, and periodic. For example, aperiodic SRS transmission is triggered by layer-1 downlink control information (DCI) transmitted on Physical Downlink Control Channel (PDCCH). On the other hand, semi-persistent SRS transmission is triggered using Medium Access Control (MAC)-Control Element (CE). In other words, MAC-CE is sent via Physical Downlink Shared Channel (PDSCH) to activate an "SRS Resource Set", or to deactivate an already activated "SRS Resource Set". The third type of SRS transmission, i.e., periodic SRS transmission, does not require activation/deactivation mechanism and upon successful reception of "SRS Resource Set" configuration parameter structure via RRC layer, the UE starts to transmit SRS at particular time instances. Time behavior of the three above mentioned SRS transmissions are depicted in FIG. 2.

Figure 2:
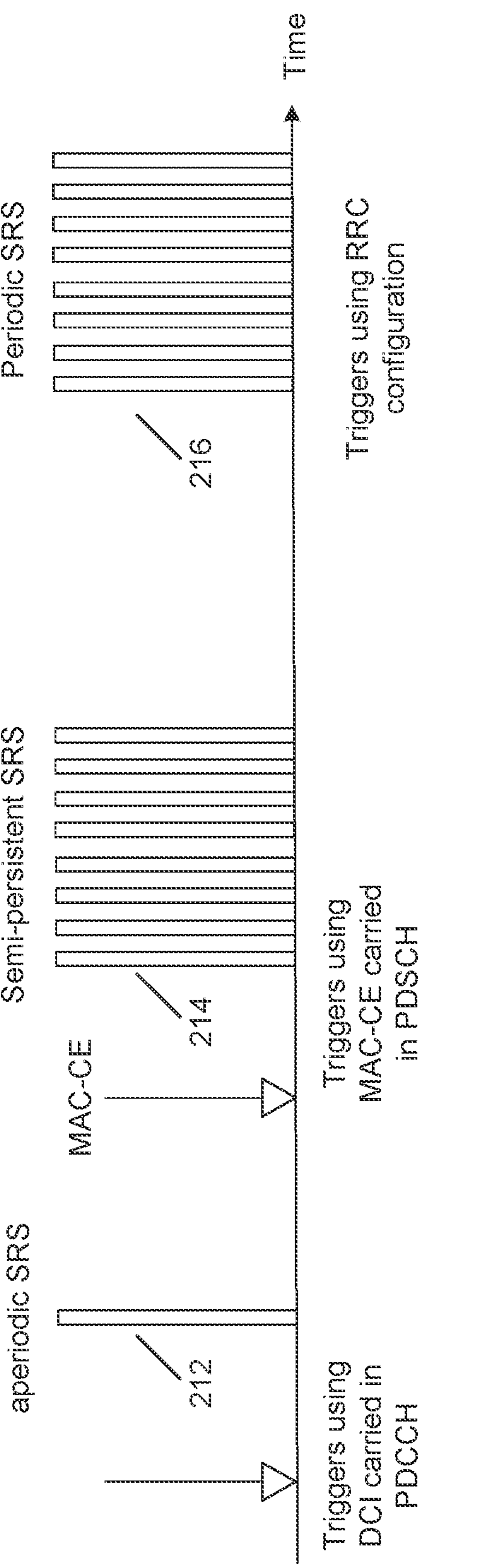
FIG. 2 is a diagram illustrating examples of aperiodic sounding reference signals (SRS) 212, semi-persistent SRS 214, and periodic SRS 216.

FIG. 2 is a diagram illustrating examples of aperiodic sounding reference signals (SRS) 212, semi-persistent SRS 214, and periodic SRS 216. One aperiodic SRS is triggered or activated via a DCI carried within PDCCH from gNB. One semi-persistent SRS signal is activated or triggered via MAC-CE carried within PDSCH. And, a periodic SRS is activated or triggered based on receiving a RRC configuration from the gNB.

In order to allow network sensing (e.g., Doppler sensing) of objects, such as based on JCAS (joint communications and sensing), multiple bursts of signals should be transmitted by the UE, e.g., with short enough periodicities and for a sufficiently long enough burst duration, to allow network sensing of objects to obtain sufficient or good Doppler sensing performance, as noted above.

However, none of the current SRS types, or SRS resource types (e.g., aperiodic SRS 212, semi-persistent SRS 214, and periodic SRS 216, FIG. 2) can be used for an efficient generation of multiple or many bursts of SRS (or sensing) signals. Rather, under these current SRS resource types, each SRS signal or each group of SRS signals is only transmitted by the UE in response to an (or separate) activation or triggering signal or RRC configuration. For example, aperiodic SRS cannot be used to efficiently transmit multiple bursts of SRS signals for sensing, since each aperiodic SRS signal 212 is transmitted based on UE receiving a different DCI. Likewise, the semi-persistent SRS 214 are generated only after receiving a MAC-CE. Thus, transmitting multiple semi-persistent SRS 214 would require significant signaling overhead, requiring a different MAC-CE to be signaled to the UE to activate or deactivate transmission of each semi-persistent SRS 212 (e.g., thus, requiring many MAC-CE signals to be transmitted and received by the UE). Similarly, each periodic SRS 216 is transmitted only after receiving a RRC configuration. Thus, transmission of multiple periodic SRS signals (or groups of signals) 216 can only be triggered via the gNB transmitting multiple RRC configurations. Thus, multiple bursts of signals, which may be useful or required for JCAS network sensing or Doppler sensing, can currently be accomplished only through using a significant amount of additional signaling, which is impractical and burdensome to both gNB and UE. Thus, the current SRS types or SRS resource types are inadequate and do not provide or allow for an efficient technique for the transmission of multiple signal bursts over time, which may be required for network sensing or Doppler sensing of objects.

Therefore, according to an example embodiment, a technique is provided that may allow gNB to configure a UE to transmit multiple (or a plurality of) sensing signal (e.g., SRS) bursts, where each sensing signal burst may include multiple (or a plurality of) sensing signal transmissions (e.g., a plurality of SRS signals). For example, the gNB may use one configuration (e.g., RRC configuration) to configure the plurality of sensing signal (e.g., SRS) bursts, and/or may use one activation signal or trigger signal (e.g., DCI or MAC-CE) to trigger or cause the UE to transmit the configured plurality of sensing signal bursts. Or, the UE may initiate or perform transmission of the configured plurality of sensing signal bursts based on detection of an event(s) (e.g., detecting occurrence of one or more events, detecting that a condition has been fulfilled, or other trigger or event detection (detecting of one or more events) by the UE). The UE may receive a sensing signal burst configuration, e.g., to configure the UE to transmit the plurality of (or multiple) sensing signal bursts (e.g., SRS bursts) that may be used for network sensing or Doppler sensing, e.g., as part of JCAS, for example. Thus, in this manner, a more efficient signaling mechanism is provided that may allow multiple sensing signal (e.g., SRS) burst to be configured and transmitted by the UE using fewer control signals and/or fewer configuration messages.

As noted above, a gNB may configure a UE to transmit an aperiodic SRS signal by indicating a resource type (resourceType) of aperiodic in the SRS-Resource set (e.g., part of the configuration sent to the UE); the gNB may configure the UE to transmit a semi-persistent SRS signal by indicating a resource type of semi-persistent in the SRS-Resource set; and the gNB may configure the UE to transmit a periodic SRS signal by indicating a resource type of periodic in the SRS-Resource set.

Furthermore, according to an example embodiment, a new resource type 9 or new signal type) may be indicated (e.g., within a configuration provided by gNB to UE) by the gNB of "burst" (e.g., burst, bursty, SRS-burst, sensing signal burst, or the like) in a configuration (e.g., such as indicated in a SRS-Resource set transmitted to the UE) to configure the UE to transmit multiple (or a plurality of) sensing signal bursts (e.g., SRS bursts).

Alternatively, rather than creating or using a new signal type or resource type (of burst type), one or more information elements or parameters may be included in the ResourceSet or burst configuration, as part of existing periodic or semi-persistent resource type for transmission of SRS signals, e.g., to adjust or configured a more efficient transmission of multiple bursts via a semi-persistent or periodic SRS signals. Thus, for example, the configuration information may include, e.g., one or more information elements (IE) s or one or more parameters that indicate a burst signal or burst signal configuration as part of a periodic resource type or as part of a semi-persistent resource type. In this manner, existing periodic or semi-persistent SRS signals may be configured for burst or multiple burst transmission, e.g., via one or more information elements that may be provided as part of the ResourceSet or burst configuration provided to the UE.

A burst, or signal burst (e.g., sensing signal burst, such as an SRS burst) may include a plurality of sensing signal (e.g., SRS) transmissions. According to an example embodiment, a UE (or other node) may transmit multiple (or a plurality of) sensing signal (e.g., SRS) bursts based on at least one of: the UE receiving one (or a single) configuration for the plurality of sensing signal bursts (e.g., which may include the SRS Resource set indicating a resource type of "burst" and/or other parameters of the burst configuration) for the plurality of sensing signal bursts; the UE receiving one burst transmission activation signal for the plurality of sensing signal bursts; or the UE detecting a (e.g., one or a single or a common event, to trigger the plurality of sensing signal bursts) triggering event for transmitting the plurality of sensing signal bursts. In this manner, by configuring the UE once for transmission of the plurality of sensing signal (e.g., SRS) bursts, and/or by the UE being activated once by the gNB or by one or a single activation signal or by one or a single (or common) event detected by the UE to trigger transmission of the configured plurality of burst signals), this may provide a more efficient technique for configuring and/or triggering/causing the UE to transmit the plurality of sensing signal (e.g., SRS) bursts, wherein each sensing signal burst (e.g., SRS burst) may include multiple (a plurality of) sensing signal (e.g., SRS) transmissions.

According to an example embodiment, this approach may be used to configure the UE to efficiently transmit multiple bursts of sensing signals, e.g., which may include the UE transmitting multiple or a plurality of sensing signal bursts (e.g., SRS bursts) based on one (or a single) configuration (e.g., based on a single SRS burst signal configuration), and/or by activating or triggering the UE to transmit the configured multiple sensing signal bursts based on one or a single activation signal received by the UE from the gNB and/or based on an event (e.g., a common or single event or a single group of events or condition(s) that are detected by the UE) detected by the UE. Thus, according to an example embodiment, a plurality of sensing signal (e.g., SRS) bursts may be configured and/or caused to be transmitted together, via use of one configuration and/or one (or common) event or activation signal, for example, which provides the technical advantage of allowing or providing transmission of multiple sensing signal bursts while reducing signaling overhead and reducing processing overhead at the gNB and UE. As noted, a new resource type or signal type of burst or burst signal may be indicated in the ResourceSet of the configuration, or an information element or parameter (e.g., indicating burst) may be provided for either the existing periodic or semi-persistent SRS signals, to allow the network node to configure the UE to transmit multiple bursts of sensing (e.g., SRS) signals.

Thus, a configuration may be provided to the UE to configure the UE to transmit multiple (or a plurality of) SRS bursts or sensing bursts, e.g., which may be used by one or more nodes for network sensing or Doppler sensing objects.

Figure 3:
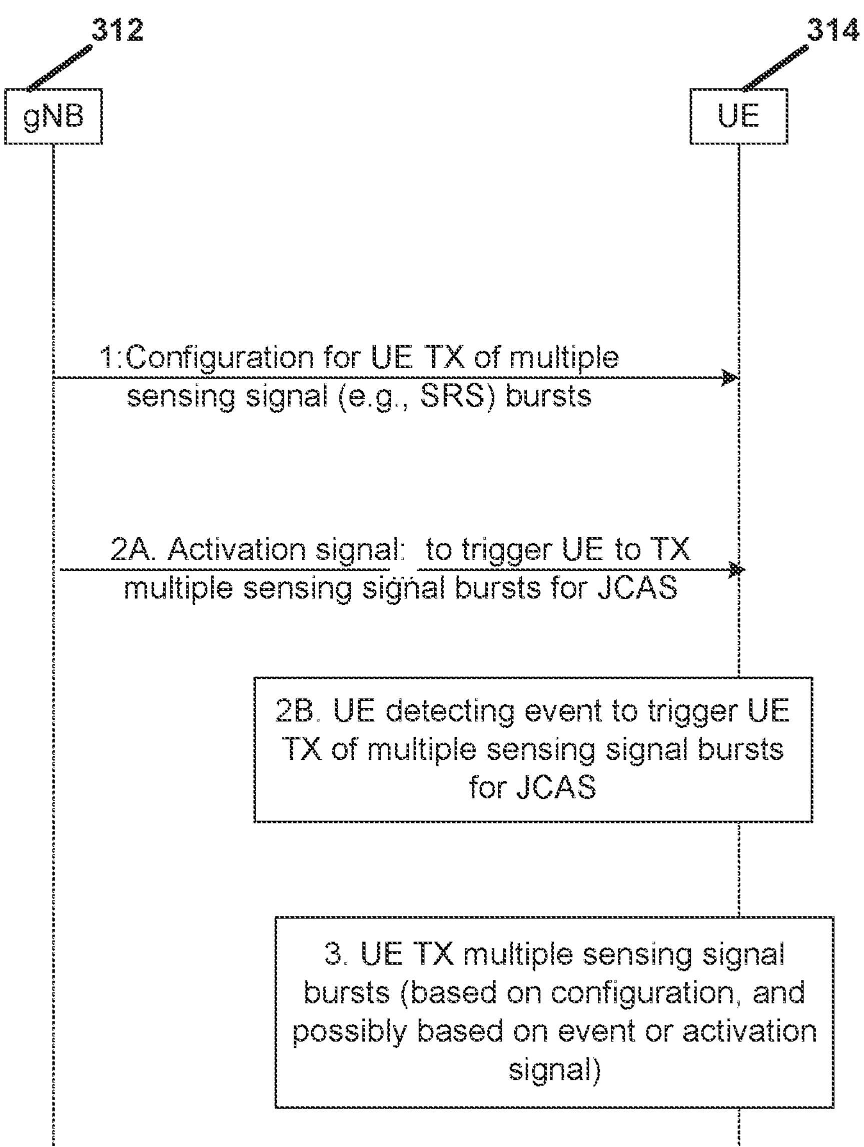
FIG. 3 is a diagram illustrating operation of a network according to an example embodiment.

FIG. 3 is a diagram illustrating operation of a network according to an example embodiment. A UE 314 may be in communication with a network node (e.g., gNB) 312. At 1, the gNB may transmit a configuration, which by way of example, may include a burst configuration that may be indicated or provide via SRS Resource set. And, for example, this SRS Resource set may indicate a resource type of "burst" or "bursty" (as examples), or may include an information element or parameter indicating burst configuration for periodic or semi-persistent signal or resource types, and may include one or more configuration parameters for configuring various aspects of the burst transmissions. The one or more parameters that may be included within the configuration are described in the examples of FIGS. 4-5, for example. Note that one or more of these parameters may be included in a configuration (e.g., burst configuration) provided or sent to the UE. In one example embodiment of FIG. 3, the UE 314 may transmit the multiple (plurality of) sensing signal bursts (e.g., SRS bursts) based on the received configuration, e.g., without requiring the UE 314 to be triggered or activated to perform such multiple burst transmission (e.g., without requiring the UE to receive an activation or triggering signal, or without the UE detecting an event that triggers transmission of the multiple sensing signal bursts).

In another example embodiment, at 2A of FIG. 3, the UE 314 may receive an activation signal (e.g., via downlink control information (DCI) within PDCCH) from gNB 312, or via MAC-CE, or via other signal or message) to cause or trigger the UE 314 to transmit the multiple sensing signal bursts in accordance with the configuration (e.g., in accordance with the burst configuration). In another example embodiment of FIG. 3, at 2B, the UE may detect an event that has occurred (e.g., which may include detecting that a particular condition or set of conditions have been fulfilled or met), which triggers or causes the UE to transmit the multiple (or plurality of) sensing signal bursts.

At 3 of FIG. 3, the UE transmits the multiple (or plurality of) sensing signal (e.g., SRS) bursts, based on the received configuration (e.g., based on the received burst configuration).

Figure 4:
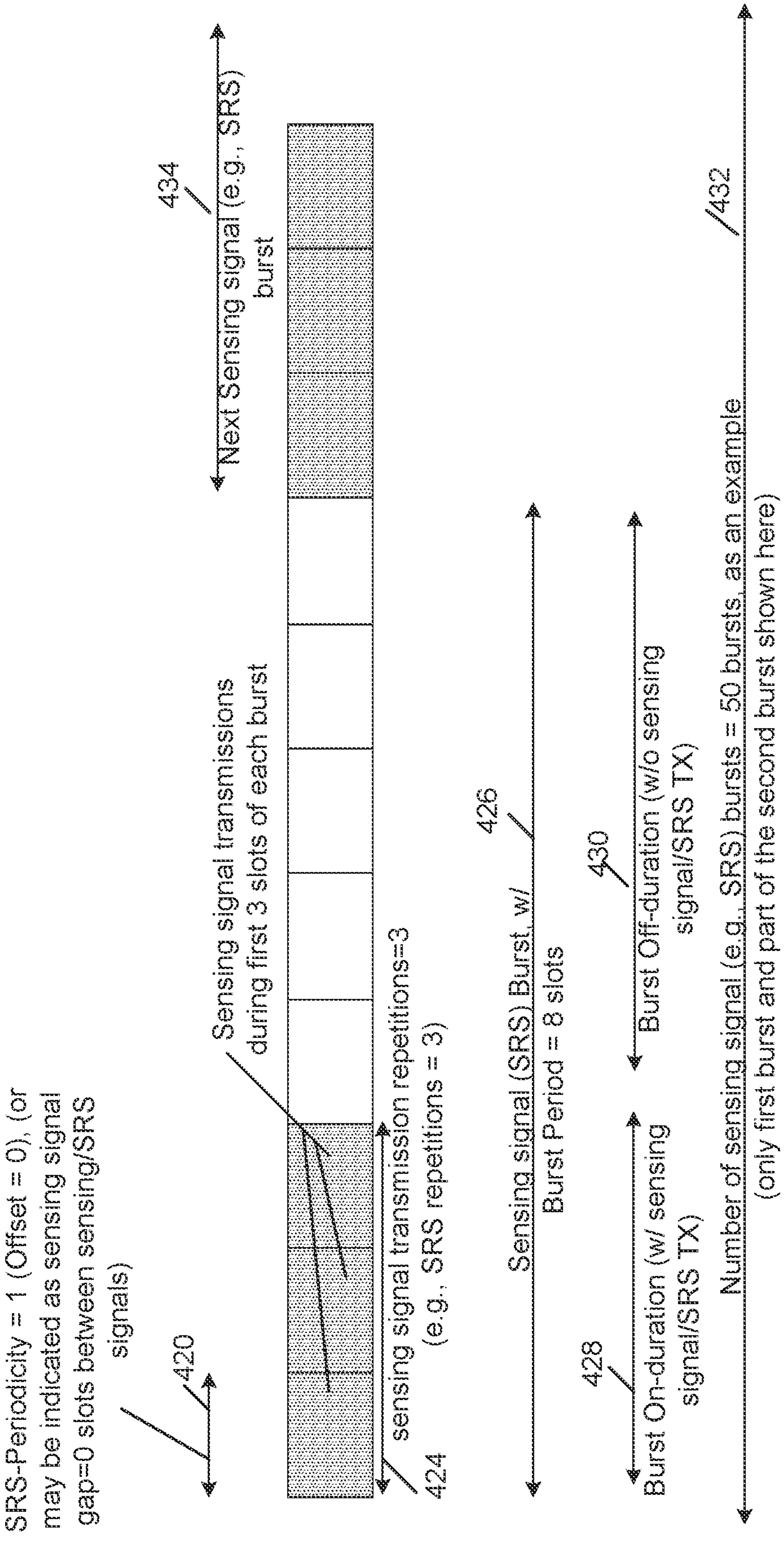
FIG. 4 is a diagram illustrating a sensing signal burst with contiguous slot transmissions according to an example embodiment.

FIG. 4 is a diagram illustrating a sensing signal burst with contiguous slot transmissions according to an example embodiment. A plurality of sensing signal (e.g., SRS) bursts are shown. Actually, only the first sensing signal burst and a portion of a second sensing signal burst is shown, but the plurality of sensing signal bursts may include many (e.g., tens, hundreds or even thousands) of bursts. As noted, the configuration (e.g., burst configuration) provided by the gNB 312 to UE 314 may include one or more (or various) configuration parameters, for example. As noted, the burst configuration may indicate a resource type (or SRS resource type) of burst or SRS burst, for example. The configuration may, in some cases, include other configuration parameter(s) to configure the UE to transmit the plurality of sensing signal bursts. Some example burst configuration parameters are described hereinbelow with reference to FIGS. 4-5.

As shown in FIG. 4, the configuration for transmission of the plurality of sensing signal bursts may indicate one or more of the following (and/or possibly other information and/or parameters): a resource type or signal type (e.g., resource type burst) (not shown in FIG. 4); a number of sensing signal bursts 432; a burst on-duration 428 and/or a burst off-duration 430; a burst period 426; sensing signal transmission repetitions (e.g., SRS repetitions) 424; a gap indicator/indication (not shown); and/or a SRS-periodicity 420, and/or other parameters or information elements.

As shown in FIG. 4, the number of sensing signal bursts 432 may indicate the total number of sensing signal bursts to be transmitted, or may indicate to transmit until deactivated (e.g., until a deactivation signal has been received by UE 314 or a deactivation event has been detected by the UE 314). Only the first sensing signal burst and a part of the second sensing signal burst is shown in FIG. 4, although the plurality of sensing signal bursts may include many (e.g., tens, hundreds, thousands) of bursts.

As shown in FIG. 4, a burst period 426 may indicate a period (e.g., in slots) for each of the sensing signal bursts. In the example of FIG. 4, the burst period is 8 slots, meaning that each burst is 8 slots in length. Although, each burst may be any length. The burst period 426 of each sensing signal burst may include 1) a burst on-duration 428 including the plurality of sensing signal (e.g., SRS) transmissions, followed by 2) an off-duration 430 without the sensing signal transmissions until end of the burst period 426. Thus, as shown in example of FIG. 4, each (or the first) sensing signal burst includes burst on-duration 428 of 3 (the first 3) slots of the burst (wherein a sensing signal is transmitted by the UE in each of these first 3 slots or the on-duration 428), followed by burst off-duration 430 (including the next 5 slots of the first burst) within which there is no transmission by the UE of sensing signal transmissions or SRS signals, for example. This pattern (burst on-duration 428 and burst off-duration 430) may be expected to repeat for other sensing signal bursts of the plurality of sensing signal bursts. Thus, the first sensing signal burst with burst period of 8 is shown, and a portion (e.g., first 3 slots) of the next/second sensing signal burst 434 is also shown in FIG. 4, and many other bursts may be included in the plurality of sensing signal transmissions that are configured for transmission by the UE 314, but are not shown. Thus, this example sensing signal burst (e.g., first sensing signal burst, having a burst period of 8 slots) may include a burst of 3 sensing signal (e.g., SRS or PRS) transmissions (e.g., part of burst on-duration 428), and then no sensing signal transmissions during a remainder of the burst period of the final 5 slots (thus, no sensing signal or SRS signal transmissions during the burst off-duration 430). This format or configuration of the sensing signal burst may repeat, e.g., for the number of sensing signal bursts 432.

Figure 5:
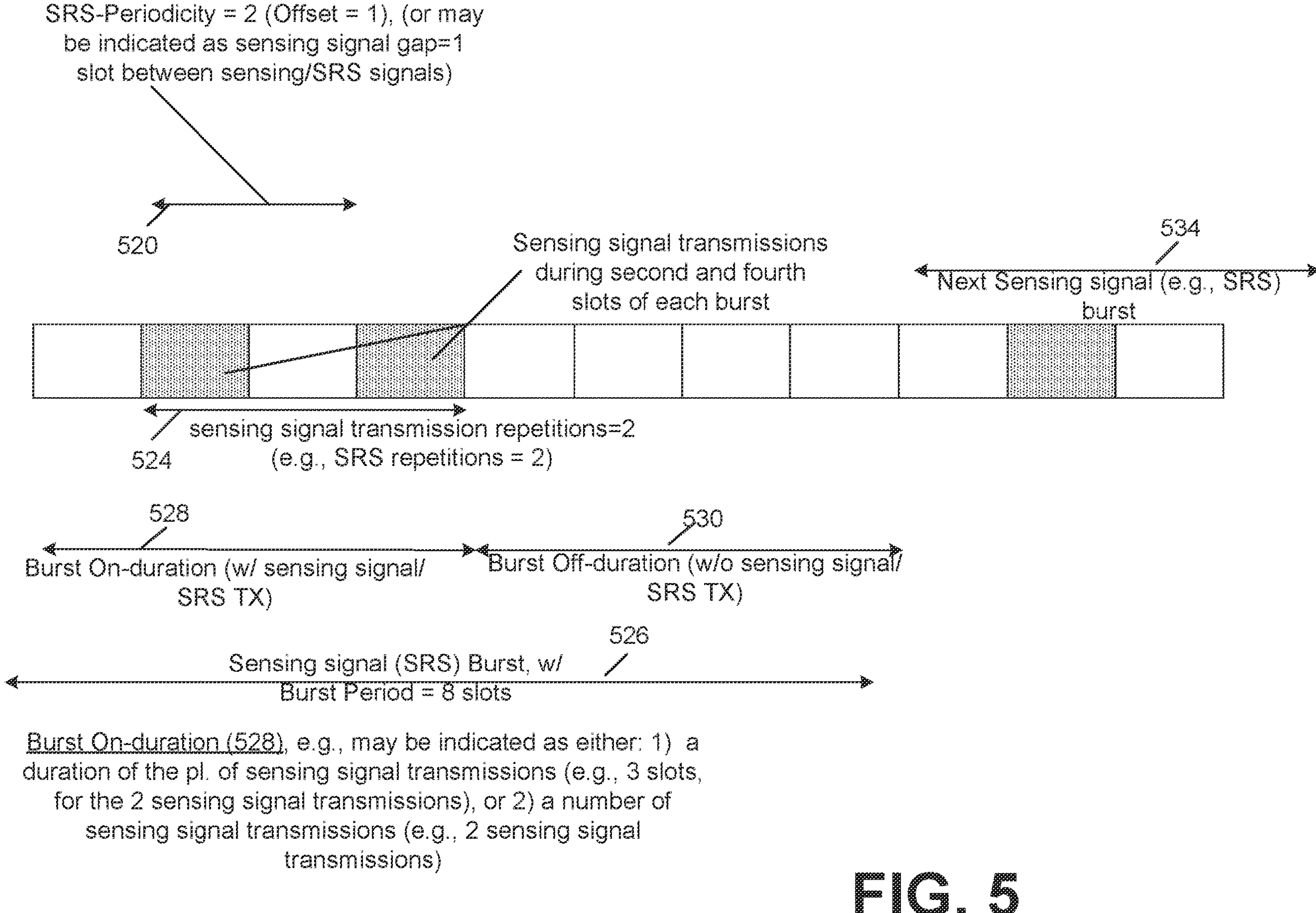
FIG. 5 is a diagram illustrating a sensing signal burst with non-contiguous slot transmissions according to an example embodiment.

Also as shown in FIG. 4, a SRS-periodicity 420 (or sensing signal transmission period or periodicity) is shown, and may indicate a period or periodicity of the sensing signal (e.g., SRS) transmissions. For example, a SRS-periodicity=1 may indicate that there is a sensing signal (e.g., SRS) signal transmission in each slot (or every slot), thus, with no gaps between successive sensing signal (or SRS) transmission. The SRS-periodicity may be valid only during the burst on-duration 428 of the burst period 426. A SRS-periodicity=2 indicates that a sensing signal (e.g., SRS) is transmitted every other slot, with a gap of 1 slot between successive sensing signal (SRS) transmissions, as shown in FIG. 5 (for example). Likewise, a SRS-periodicity=3 indicates that a sensing signal will be transmitted every third slot, with a gap of 2 slots between each sensing signal transmission (no sensing signal/SRS is transmitted during the gap(s)). Alternatively, or in addition, a sensing signal gap may be indicated of 0, meaning that no gap is provided between successive or adjacent sensing signal transmissions (as shown in FIG. 4). Likewise, a sensing signal gap=1 may indicate that a gap of 1 slot is provided between successive or adjacent sensing signal transmissions (see FIG. 5 for an example of this configuration). Also, as shown in FIG. 4, the burst on-duration 428 (e.g., which may be provided as a burst on-duration indicator within a configuration sent to the UE) may indicate a duration of the plurality of sensing signal transmissions (e.g., plurality of SRS transmissions) within each of the plurality of sensing signal bursts. There may be different ways or different parameters that may be used to indicate this burst on-duration 428. For example, the burst on-duration 428 may be indicated as either (for example): a (e.g., total) duration (e.g., in time, slots or resources) of the plurality of sensing signal transmissions (or alternatively of the on-duration) within each of the sensing signal bursts. The duration of the sensing signal transmissions may include any gaps that may be present between sensing signal transmissions. For example, in FIG. 4, the duration of the plurality of sensing signal transmissions=3 may indicate a duration of 3 slots (for transmission of 3 sensing signal transmissions), and there are no gaps between any of the sensing signal transmissions. However, in FIG. 5, the burst on-duration 528 of the plurality of sensing signal transmissions=3 slots, which includes two sensing signal transmissions (one each slot) and a slot in between, for a total sensing signals duration of 3 slots. Alternatively, or in addition, the burst on-duration 428 may be indicated as a number of sensing signal transmissions, which is 3 in FIG. 4, since there are 3 sensing signal transmissions (one sensing signal transmission in each of first 3 slots of the burst).

FIG. 5 is a diagram illustrating a sensing signal burst with non-contiguous slot transmissions according to an example embodiment. The differences from the configuration or burst format shown in FIG. 4 will be briefly described. The plurality of sensing signal bursts in FIG. 5 includes a burst period (526)=8 slots, and includes a burst on-duration 528, and a burst off-duration 530. The burst on-duration 528 may include the first four slots (that includes the second and fourth slots where a sensing signal is transmitted, and a gap in between, and may also include an initial gap or offset). The burst off-duration 530 may include the remaining 4 slots of the 8 slots burst period, where no sensing signal (e.g., SRS) transmissions are provided by the UE. The format or configuration or pattern of the first sensing signal burst in FIG. 5 is repeated for the other sensing signal bursts, including for the second signal burst 534 (the first 3 slots of the second sensing signal burst 534 is shown).

A sensing signal transmission repetitions (524)=2 in FIG. 5, indicating that two sensing signal transmissions are included in the first sensing signal burst (and in each sensing signal burst). Sensing signal periodicity (e.g., SRS-periodicity) (520)=2, indicating that a sensing signal (e.g., SRS) transmission is provided by the UE every two (or every other) slot, including the second and fourth slots, of the burst on-duration 528. Alternatively, or in addition, a sensing signal gap=1 may indicate a gap of 1 slot is provided between each of the sensing signal transmissions. The burst on-duration 528 may be indicated as either a duration of the plurality of sensing signal transmissions=3 slots, or a number of sensing signal transmissions=2 sensing signal transmissions (with a gap of 1 slot therebetween per SRS=periodicity).

As noted, the configuration (e.g., burst configuration) provided by the gNB to the UE may indicate one or more, or various sets or subsets, of these example configuration parameters, or may include other parameter(s) that may convey the same or same type of information regarding the burst configuration.

Further examples are provided here, according to an example embodiment.

Assuming FR1 (f_c/carrier frequency=3.5 GHz) and 15 kHz subcarrier spacing, i.e., 1 ms slot duration, the following value ranges may be used, for example, to achieve a reasonably good performance, for example:

SRS-Periodicity (420, 520): Current standards or specifications already support a periodicity of one slot, which should be enough tolerate the maximum occurring velocity in most relevant use cases.

Sensing signal transmission repetitions (e.g., SRS repetitions) (424, 524): the desired burst duration T_Burst (corresponding to Burst On-duration 428, 528) should be achievable even in the case of contiguous slot transmissions with SRS-Periodicity=1. Therefore, it is possible to choose sensing signal transmission repetitions (e.g., SRS repetitions) (424, 524) such that burst on-durations in the range of 100 ms can be achieved. A possible value range could therefore be T_rep^(burst period)∈{1, 2, 4, 8, 16, 32, 64, 128, 256} (where T_rep may refer to the sensing signal gap).

Burst Period (426, 526): the value range should allow for very frequent updates, e.g., every 10-50-100 ms as for positioning updates. On the other hand, for sensing slowly moving targets and to save resources, also more infrequent updates should be supported, e.g., in the order of several seconds. Therefore, a possible value range could be T_per^ (burst period (426, 526))∈{10, 16, 20, 32, 40, 64, 80, 160, 320, 640, 1280, 2560, 5120, 10240}, corresponding to update rates ranging from 10 ms to roughly 10 s. Clearly, Burst period (426, 526) may be configured such that Burst Period>Burst On-duration (428, 528) holds.

FIG. 6 is a flow chart illustrating operation of a user device (or UE) according to an example embodiment. Operation 610 includes receiving, by a user device from a network node, configuration information to configure the user device to transmit a plurality of sensing signal bursts, wherein each of the sensing signal bursts includes a plurality of sensing signal transmissions, the configuration information indicating at least: a burst period indicator indicating a period of each of the sensing signal bursts; and a burst on-duration indicator indicating a duration of the plurality of sensing signal transmissions in each of the sensing signal bursts. And, operation 620 includes transmitting, by the user device, the plurality of sensing signal bursts in accordance with the configuration information.

With respect to the method of FIG. 6, the configuration information further includes: a signal type indicator or resource type indicator that indicates a signal type or resource type of at least one of the following: a signal type or resource type of burst; a signal type or resource type of sensing signal burst; or a signal type or resource type of sounding reference signal (SRS) burst.

With respect to the method of FIG. 6, the configuration information further includes: one or more information element (IE) s or one or more parameters that indicate a burst signal or burst signal configuration as part of a periodic resource type or as part of a semi-persistent resource type.

With respect to the method of FIG. 6, the configuration information further includes: a sensing signal gap between consecutive sensing signal transmissions within each of the sensing signal bursts. Also, the burst on-duration indicator may include or takes into account any gaps that are present between sensing signal transmissions within each of the sensing signal bursts. For example, the sensing signal gap may be communicated or by a sounding reference signal (SRS) periodicity. The sensing signal gap may include one or more slots.

With respect to the method of FIG. 6, the method may further include receiving, by the user device from the network node, an activation signal to activate transmission of the plurality of sensing signal bursts; wherein the transmitting comprises transmitting, by the user device, the plurality of sensing signal bursts based on the activation signal and in accordance with the configuration information.

With respect to the method of FIG. 6, the method further include receiving, by the user device from the network node, a deactivation signal to deactivate transmission of the plurality of sensing signal bursts; the method further comprising ceasing transmitting, by the user device, the plurality of sensing signal bursts based on the deactivation signal.

With respect to the method of FIG. 6, the method may further include detecting, by the user device, that an event has occurred; and wherein the transmitting includes transmitting, by the user device, the plurality of sensing signal bursts based on the detecting and in accordance with the configuration information.

With respect to the method of FIG. 6, the configuration information further indicates a starting offset that indicates a start of the transmission of the plurality of sensing signal bursts; wherein the offset indicates a start of the transmission of the plurality of sensing signal bursts from or with respect to at least one of the following: a receipt, by the user device, of an activation command; or a timing of a detection, by the user device, that event has occurred.

With respect to the method of FIG. 6, the configuration information further indicates a number of sensing signal bursts to be transmitted.

With respect to the method of FIG. 6, the burst on-duration indicator indicates: a total duration of the plurality of sensing signal transmissions within each of the sensing signal bursts.

With respect to the method of FIG. 6, the burst on-duration indicator may indicate: a total duration of the plurality of sensing signal transmissions within each of the sensing signal bursts, including any gaps that are present between sensing signal transmissions.

With respect to the method of FIG. 6, the burst on-duration indicator may indicate: a number of sensing signal transmissions within each of the sensing signal bursts.

With respect to the method of FIG. 6, the sensing signal transmissions may include at least one of sounding reference signal transmissions or positioning reference signal transmissions.

With respect to the method of FIG. 6, the transmitting, by the user device, the plurality of sensing signal bursts may be performed based on, or in response to, at least one of the following: the user device receiving one configuration for the plurality of sensing signal bursts; the user device receiving one burst transmission activation signal for the plurality of sensing signal bursts; or the user device detecting a triggering event for transmitting the plurality of sensing signal bursts.

With respect to the method of FIG. 6, each of the sensing signal bursts, of the plurality of sensing signal bursts, repeats every burst period; and wherein each of the burst periods comprises: 1) the burst on-duration having a length or duration indicated by the burst on-duration indicator, wherein the on-duration including the plurality of sensing signal transmissions, followed by 2) a burst off-duration without the sensing signal transmissions until end of the burst period.

With respect to the method of FIG. 6, the burst off-duration may be a different time period than one or more gaps between the sensing signal transmissions of each of the sensing signal bursts.

With respect to the method of FIG. 6, the plurality of sensing signal transmissions may include a plurality of sounding reference signal (SRS) transmissions, wherein the configuration information further indicates: a SRS periodicity that indicates a period or periodicity of the SRS transmissions within each of the plurality of sensing signal bursts.

FIG. 7 is a flow chart illustrating operation of a network node (e.g., gNB) according to an example embodiment. Operation 710 includes transmitting, by a network node to a user device, configuration information to configure the user device to transmit a plurality of sensing signal bursts, wherein each of the sensing signal bursts includes a plurality of sensing signal transmissions, the configuration information indicating at least: a burst period indicator indicating a period of each of the sensing signal bursts; and a burst on-duration indicator indicating a duration of each of the sensing signal bursts.

With respect to the method of FIG. 7, the method may further include receiving, by the network node, one or more sensing signal reflections, wherein the one or more sensing signal reflections comprise a signal reflected off of one or more objects based on the one or more sensing signal transmissions transmitted by the user device.

With respect to the method of FIG. 7, the method may further include performing, by the network node, sensing of the one or more objects based on the received sensing signal reflections, e.g., which may include performing Doppler sensing of the one or more objects. Some examples will now be described.

Example 1. A method comprising: A method comprising: receiving, by a user device from a network node, configuration information to configure the user device to transmit a plurality of sensing signal bursts, wherein each of the sensing signal bursts includes a plurality of sensing signal transmissions, the configuration information indicating at least: a burst period indicator indicating a period of each of the sensing signal bursts; and a burst on-duration indicator indicating a duration of the plurality of sensing signal transmissions in each of the sensing signal bursts; and transmitting, by the user device, the plurality of sensing signal bursts in accordance with the configuration information.

Example 2. The method of example 1, wherein the configuration information further comprises: a signal type indicator or resource type indicator that indicates a signal type or resource type of at least one of the following: a signal type or resource type of burst; a signal type or resource type of sensing signal burst; or a signal type or resource type of sounding reference signal (SRS) burst.

Example 3. The method of example 1, wherein the configuration information further comprises: one or more information elements (IE) s or one or more parameters that indicate a burst signal or burst signal configuration as part of a periodic resource type or as part of a semi-persistent resource type.

Example 4. The method of any of examples 1-3, wherein the configuration information further indicates: a sensing signal gap between consecutive sensing signal transmissions within each of the sensing signal bursts.

Example 5. The method of example 4, wherein the burst on-duration indicator includes or takes into account any gaps that are present between sensing signal transmissions within each of the sensing signal bursts.

Example 6. The method of any of examples 4-5, wherein the sensing signal gap is indicated by a sounding reference signal (SRS) periodicity.

Example 7. The method of any of examples 4-6, wherein the sensing signal gap comprises one or more slots.

Example 8. The method of any of examples 1-7, further comprising: receiving, by the user device from the network node, an activation signal to activate transmission of the plurality of sensing signal bursts; wherein the transmitting comprises transmitting, by the user device, the plurality of sensing signal bursts based on the activation signal and in accordance with the configuration information.

Example 9. The method of example 8, wherein the method further comprises: receiving, by the user device from the network node, a deactivation signal to deactivate transmission of the plurality of sensing signal bursts; the method further comprising ceasing transmitting, by the user device, the plurality of sensing signal bursts based on the deactivation signal.

Example 10. The method of any of examples 1-9, further comprises: detecting, by the user device, that an event has occurred; and wherein the transmitting comprises transmitting, by the user device, the plurality of sensing signal bursts based on the detecting and in accordance with the configuration information.

Example 11. The method of any of examples 1-10 wherein the configuration information further indicates a starting offset that indicates a start of the transmission of the plurality of sensing signal bursts; wherein the offset indicates a start of the transmission of the plurality of sensing signal bursts from or with respect to at least one of the following: a receipt, by the user device, of an activation command; or a timing of a detection, by the user device, of an event.

Example 12. The method of any of examples 1-11, wherein the configuration information further indicates a number of sensing signal bursts to be transmitted.

Example 13. The method of any of examples 1-12, wherein the burst on-duration indicator indicates: a total duration of the plurality of sensing signal transmissions within each of the sensing signal bursts.

Example 14. The method of any of examples 1-12, wherein the burst on-duration indicator indicates: a total duration of the plurality of sensing signal transmissions within each of the sensing signal bursts, including any gaps that are present between sensing signal transmissions.

Example 15. The method of any of examples 1-12, wherein the burst on-duration indicator indicates: a number of sensing signal transmissions within each of the sensing signal bursts.

Example 16. The method of any of examples 1-15, wherein the sensing signal transmissions comprise at least one of sounding reference signal transmissions or positioning reference signal transmissions.

Example 17. The method of any of examples 1-16, wherein the transmitting, by the user device, the plurality of sensing signal bursts is performed based on, or in response to, at least one of the following: the user device receiving one configuration for the plurality of sensing signal bursts; the user device receiving one burst transmission activation signal for the plurality of sensing signal bursts; or the user device detecting a triggering event for transmitting the plurality of sensing signal bursts.

Example 18. The method of any of examples 1-17: wherein each of the sensing signal bursts, of the plurality of sensing signal bursts, repeats every burst period; and wherein each of the burst periods comprises: 1) the burst on-duration including the plurality of sensing signal transmissions, followed by 2) a burst off-duration without the sensing signal transmissions until end of the burst period.

Example 19. The method of example 18, wherein the burst off-duration is a different time period than one or more gaps between the sensing signal transmissions of each of the sensing signal bursts.

Example 20. The method of any of examples 1-19, wherein the plurality of sensing signal transmissions comprise a plurality of sounding reference signal (SRS) transmissions, wherein the configuration information further indicates: a SRS periodicity that indicates a period or periodicity of the SRS transmissions within each of the plurality of sensing signal bursts.

Example 21. An apparatus comprising: at least one processor; and at least one memory including computer program code; the at least one memory and the computer program code configured to, with the at least one processor, cause the apparatus at least to perform the method of any of examples 1-20.

Example 22. A non-transitory computer-readable storage medium comprising instructions stored thereon that, when executed by at least one processor, are configured to cause a computing system to perform the method of any of examples 1-20.

Example 23. An apparatus comprising means for performing the method of any of examples 1-20.

Example 24. An apparatus comprising: at least one processor; and at least one memory including computer program code; the at least one memory and the computer program code configured to, with the at least one processor, cause the apparatus at least to: receive, by a user device from a network node, configuration information to configure the user device to transmit a plurality of sensing signal bursts, wherein each of the sensing signal bursts includes a plurality of sensing signal transmissions, the configuration information indicating at least: a burst period indicator indicating a period of each of the sensing signal bursts; and a burst on-duration indicator indicating a duration of the plurality of sensing signal transmissions in each of the sensing signal bursts; and transmit, by the user device, the plurality of sensing signal bursts in accordance with the configuration information.

Example 25. A method comprising: transmitting, by a network node to a user device, configuration information to configure the user device to transmit a plurality of sensing signal bursts, wherein each of the sensing signal bursts includes a plurality of sensing signal transmissions, the configuration information indicating at least: a burst period indicator indicating a period of each of the sensing signal bursts; and a burst on-duration indicator indicating a duration of the plurality of sensing signal transmissions in each of the sensing signal bursts.

Example 26. The method of example 25, further comprising: receiving, by the network node, one or more sensing signal reflections, wherein the one or more sensing signal reflections comprise a signal reflected off of one or more objects based on the one or more sensing signal transmissions transmitted by the user device.

Example 27. The method of example 26, further comprising: performing, by the network node, sensing of the one or more objects based on the received sensing signal reflections.

Example 28. The method of example 27, wherein performing sensing comprises performing sensing of a speed of the one or more objects.

Example 29. The method of any of examples 25-28, wherein the configuration information further comprises: a signal type indicator or resource type indicator that indicates a signal type or resource type of at least one of the following: a signal type or resource type of burst; a signal type or resource type of sensing signal burst; or a signal type or resource type of sounding reference signal (SRS) burst.

Example 30. The method of claim of any of examples 25-28, wherein the configuration information further comprises: one or more information elements (IE) s or one or more parameters that indicate a burst signal or burst signal configuration as part of a periodic resource type or as part of a semi-persistent resource type.

Example 31. The method of any of examples 25-30, wherein the configuration information further indicates: a sensing signal gap between consecutive sensing signal transmissions within each of the sensing signal bursts.

Example 32. The method of example 31, wherein the burst on-duration indicator includes or takes into account any gaps that are present between sensing signal transmissions within each of the sensing signal bursts.

Example 33. The method of any of examples 31-32 wherein the sensing signal gap is indicated by a sounding reference signal (SRS) periodicity.

Example 34. The method of any of examples 25-33 wherein the configuration information further indicates a starting offset that indicates a start of the transmission of the plurality of sensing signal bursts; wherein the offset indicates a start of the transmission of the plurality of sensing signal bursts from or with respect to at least one of the following: a receipt, by the user device, of an activation command; or a timing of a detection, by the user device, that event has occurred.

Example 35. The method of any of examples 25-34, wherein the configuration information further indicates a number of sensing signal bursts to be transmitted.

Example 36. The method of any of examples 25-35, wherein the burst on-duration indicator indicates: a total duration of the plurality of sensing signal transmissions within each of the sensing signal bursts.

Example 37. The method of any of examples 25-36, wherein the burst on-duration indicator indicates: a total duration of the plurality of sensing signal transmissions within each of the sensing signal bursts, including any gaps that are present between sensing signal transmissions.

Example 38. The method of any of examples 25-37, wherein the burst on-duration indicator indicates: a number of sensing signal transmissions within each of the sensing signal bursts.

Example 39. The method of any of examples 25-38, wherein the sensing signal transmissions comprise at least one of sounding reference signal transmissions or positioning reference signal transmissions.

Example 40. The method of any of examples 25-39: wherein each of the sensing signal bursts, of the plurality of sensing signal bursts, repeats every burst period; and wherein each of the burst periods comprises: 1) the burst on-duration including the plurality of sensing signal transmissions, followed by 2) a burst off-duration without the sensing signal transmissions until end of the burst period.

Example 41. An apparatus comprising: at least one processor; and at least one memory including computer program code; the at least one memory and the computer program code configured to, with the at least one processor, cause the apparatus at least to perform the method of any of examples 25-40.

Example 42. A non-transitory computer-readable storage medium comprising instructions stored thereon that, when executed by at least one processor, are configured to cause a computing system to perform the method of any of examples 25-40.

Example 43. An apparatus comprising means for performing the method of any of examples 25-40.

Example 44. An apparatus comprising: at least one processor; and at least one memory including computer program code; the at least one memory and the computer program code configured to, with the at least one processor, cause the apparatus at least to: transmit, by a network node to a user device, configuration information to configure the user device to transmit a plurality of sensing signal bursts, wherein each of the sensing signal bursts includes a plurality of sensing signal transmissions, the configuration information indicating at least: a burst period indicator indicating a period of each of the sensing signal bursts; and a burst on-duration indicator indicating a duration of the plurality of sensing signal transmissions in each of the sensing signal bursts.

Example 45. The method of any of examples 1 and 25 (or any other examples above), wherein the configuration information further indicates or comprises at least one or more of the following: a SRS-periodicity or a period of each sensing signal transmission; or a burst off-duration of each of the sensing signal bursts.

Figure 8:
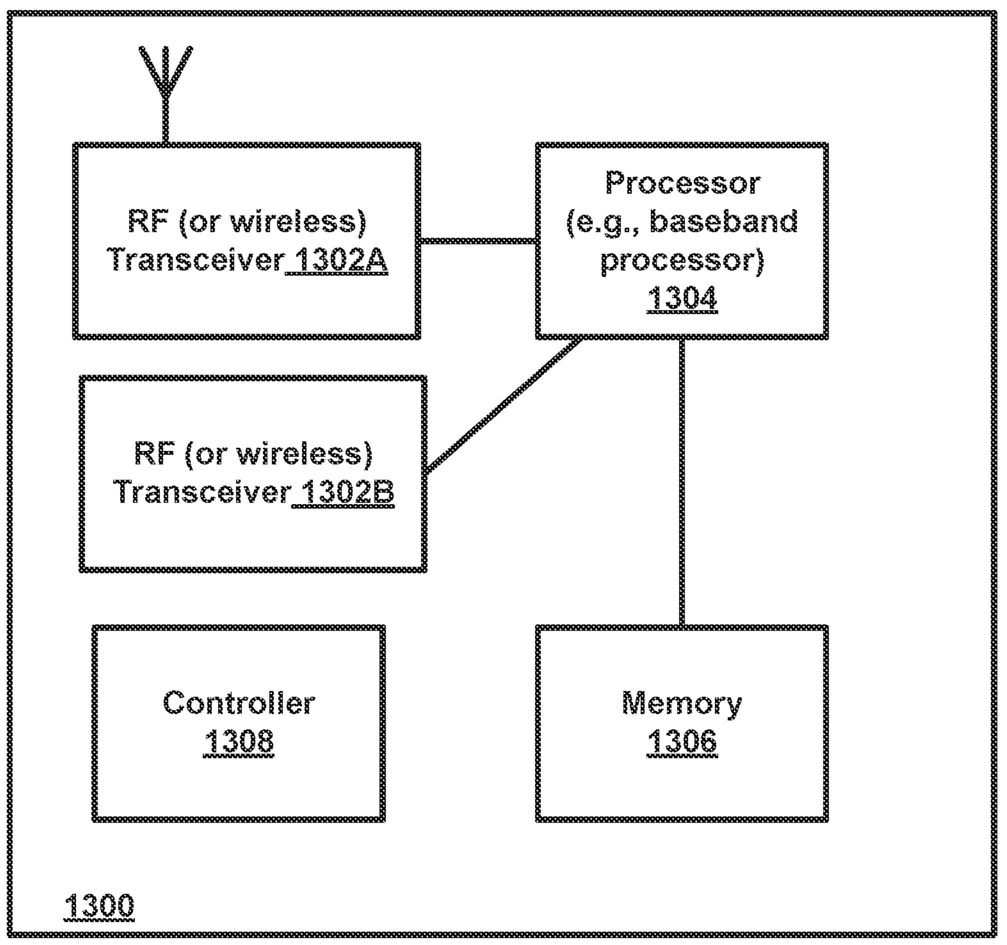
FIG. 8 is a block diagram of a wireless station or node (e.g., network node (such as gNB), user node or UE, relay node, or other node).

FIG. 8 is a block diagram of a wireless station or node (e.g., UE, user device, AP, BS, eNB, gNB, RAN node, network node, TRP, or other node) 1300 according to an example embodiment. The wireless station 1300 may include, for example, one or more (e.g., two as shown in FIG. 8) RF (radio frequency) or wireless transceivers 1302A, 1302B, where each wireless transceiver includes a transmitter to transmit signals and a receiver to receive signals. The wireless station also includes a processor or control unit/entity (controller) 1304 to execute instructions or software and control transmission and receptions of signals, and a memory 1306 to store data and/or instructions.

Processor 1304 may also make decisions or determinations, generate frames, packets or messages for transmission, decode received frames or messages for further processing, and other tasks or functions described herein. Processor 1304, which may be a baseband processor, for example, may generate messages, packets, frames or other signals for transmission via wireless transceiver 1302 (1302A or 1302B). Processor 1304 may control transmission of signals or messages over a wireless network, and may control the reception of signals or messages, etc., via a wireless network (e.g., after being down-converted by wireless transceiver 1302, for example). Processor 1304 may be programmable and capable of executing software or other instructions stored in memory or on other computer media to perform the various tasks and functions described above, such as one or more of the tasks or methods described above. Processor 1304 may be (or may include), for example, hardware, programmable logic, a programmable processor that executes software or firmware, and/or any combination of these. Using other terminology, processor 1304 and transceiver 1302 together may be considered as a wireless transmitter/receiver system, for example.

In addition, referring to FIG. 8, a controller (or processor) 1308 may execute software and instructions, and may provide overall control for the station 1300, and may provide control for other systems not shown in FIG. 8, such as controlling input/output devices (e.g., display, keypad), and/or may execute software for one or more applications that may be provided on wireless station 1300, such as, for example, an email program, audio/video applications, a word processor, a Voice over IP application, or other application or software.

In addition, a storage medium may be provided that includes stored instructions, which when executed by a controller or processor may result in the processor 1304, or other controller or processor, performing one or more of the functions or tasks described above.

According to another example embodiment, RF or wireless transceiver(s) 1302A/1302B may receive signals or data and/or transmit or send signals or data. Processor 1304 (and possibly transceivers 1302A/1302B) may control the RF or wireless transceiver 1302A or 1302B to receive, send, broadcast or transmit signals or data.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method performed by a user device, the method comprising:

receiving a single configuration to configure the user device to transmit a plurality of sensing signal bursts, wherein each sensing signal burst comprises a burst envelope including a burst on-duration followed by a burst off-duration, and wherein each burst on-duration includes a plurality of sensing signal transmissions, wherein the configuration information indicates the following:

a burst period indicator defining a repetition period of each sensing signal burst;

a burst on-duration indicator defining either (i) a total duration or (ii) a number of sensing signal transmissions within the burst on-duration;

a burst resource type distinct from aperiodic, semi-persistent, and periodic sounding reference signal resource types; and one or more information elements that modify a periodic or semi-persistent sounding reference signal resource to operate as a sensing signal burst; and transmitting the plurality of sensing signal bursts autonomously in accordance with the configuration without receiving a separate downlink control information, media access control (MAC) control element, or radio resource control message for each sensing signal burst.

2. The method of claim 1, wherein the configuration information further indicates a sensing signal periodicity that defines a time gap between consecutive sensing signal transmissions within the burst on-duration.

3. The method of claim 2, wherein the sensing signal periodicity indicates one sensing signal transmission per slot during the burst on-duration.

4. The method of claim 2, wherein the sensing signal periodicity indicates non-contiguous slot transmissions during the burst on-duration, such that at least one slot within the burst on-duration does not include a sensing signal transmission.

5. The method of claim 4, wherein the burst on-duration indicator specifies a number of sensing signal transmissions, and wherein the duration of the burst on-duration includes any gaps between the sensing signal transmissions.

6. The method of claim 5, wherein the configuration information further indicates a number of sensing signal bursts to be transmitted by the user device.

7. The method of claim 6, wherein transmitting the plurality of sensing signal bursts is initiated based on a single activation signal received from the network node, and wherein the user device transmits the plurality of sensing signal bursts without receiving additional activation signaling for individual bursts.

8. The method of claim 6, wherein transmitting the plurality of sensing signal bursts is initiated based on a detection of a triggering event by the user device, and wherein the triggering event is common to the plurality of sensing signal bursts.

9. The method of claim 8, wherein each sensing signal burst repeats every burst period, and wherein each burst period comprises:

(a) the burst on-duration including the plurality of sensing signal transmissions; and (b) a burst off-duration during which no sensing signal transmissions are transmitted by the user device.

10. The method of claim 9, wherein the sensing signal transmissions comprise sounding reference signal (SRS) transmissions configured for Doppler-based sensing of one or more objects.

11. A user device comprising:

a processor; and a memory comprising computer-executable instructions that, when executed by the processor, cause the user device to perform the following operations:

receiving a single configuration to configure the user device to transmit a plurality of sensing signal bursts, wherein each sensing signal burst comprises a burst envelope including a burst on-duration followed by a burst off-duration, and wherein each burst on-duration includes a plurality of sensing signal transmissions, wherein the configuration information indicates the following:

a burst period indicator defining a repetition period of each sensing signal burst;

a burst on-duration indicator defining either (i) a total duration or (ii) a number of sensing signal transmissions within the burst on-duration;

a burst resource type distinct from aperiodic, semi-persistent, and periodic sounding reference signal resource types; and one or more information elements that modify a periodic or semi-persistent sounding reference signal resource to operate as a sensing signal burst; and transmitting the plurality of sensing signal bursts autonomously in accordance with the configuration without receiving a separate downlink control information, media access control (MAC) control element, or radio resource control message for each sensing signal burst.

12. The user device of claim 11, wherein the configuration information further indicates a sensing signal periodicity that defines a time gap between consecutive sensing signal transmissions within the burst on-duration.

13. The user device of claim 12, wherein the sensing signal periodicity indicates one sensing signal transmission per slot during the burst on-duration.

14. The user device of claim 12, wherein the sensing signal periodicity indicates non-contiguous slot transmissions during the burst on-duration, such that at least one slot within the burst on-duration does not include a sensing signal transmission.

15. The user device of claim 14, wherein the burst on-duration indicator specifies a number of sensing signal transmissions, and wherein the duration of the burst on-duration includes any gaps between the sensing signal transmissions.

16. The user device of claim 15, wherein the configuration information further indicates a number of sensing signal bursts to be transmitted by the user device.

17. The user device of claim 16, wherein transmitting the plurality of sensing signal bursts is initiated based on a single activation signal received from the network node, and wherein the user device transmits the plurality of sensing signal bursts without receiving additional activation signaling for individual bursts.

18. The user device of claim 16, wherein transmitting the plurality of sensing signal bursts is initiated based on a detection of a triggering event by the user device, and wherein the triggering event is common to the plurality of sensing signal bursts.

19. The user device of claim 18, wherein each sensing signal burst repeats every burst period, and wherein each burst period comprises:

(a) the burst on-duration including the plurality of sensing signal transmissions; and (b) a burst off-duration during which no sensing signal transmissions are transmitted by the user device.

20. The user device of claim 19, wherein the sensing signal transmissions comprise sounding reference signal (SRS) transmissions configured for Doppler-based sensing of one or more objects.

* * * * *